US012403717B2

(12) United States Patent
Giering et al.

(10) Patent No.: US 12,403,717 B2
(45) Date of Patent: Sep. 2, 2025

(54) METHOD FOR PRODUCING A DATA CARRIER HAVING A LUMINESCENT SECURITY ELEMENT, AND DATA CARRIER

(71) Applicant: GIESECKE+DEVRIENT CURRENCY TECHNOLOGY GMBH, Munich (DE)

(72) Inventors: Thomas Giering, Kirchseeon (DE); Thomas Happ, Munich (DE); Stephan Steinlein, Munich (DE); Johann Kecht, Munich (DE); Kai Uwe Stock, Grunwald (DE); Sina Scholz-Riecke, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/693,640

(22) PCT Filed: Sep. 22, 2022

(86) PCT No.: PCT/EP2022/025439
§ 371 (c)(1),
(2) Date: Mar. 20, 2024

(87) PCT Pub. No.: WO2023/046319
PCT Pub. Date: Mar. 30, 2023

(65) Prior Publication Data

US 2024/0391271 A1 Nov. 28, 2024

(30) Foreign Application Priority Data

Sep. 24, 2021 (DE) ..................... 10 2021 004 847.4

(51) Int. Cl.
*B42D 25/387* (2014.01)
*B42D 25/29* (2014.01)

(52) U.S. Cl.
CPC ........... *B42D 25/387* (2014.10); *B42D 25/29* (2014.10)

(58) Field of Classification Search
CPC .............................. B42D 25/387; B42D 25/29
USPC .... 283/67, 72, 91, 92, 94, 98, 114, 117, 901
See application file for complete search history.

(56) References Cited

U.S. PATENT DOCUMENTS

2018/0311992 A1* 11/2018 Kecht .................. C09K 11/025
2021/0070080 A1 3/2021 Kecht et al.
2021/0260909 A1 8/2021 Holmes et al.

FOREIGN PATENT DOCUMENTS

DE 102017004496 A1 11/2018
EP 1179808 A1 2/2002
EP 2602119 A1 6/2013
EP 1567358 B2 9/2020
(Continued)

OTHER PUBLICATIONS

German Search Report from corresponding German Patent Application No. DE102021004847.4, Jun. 9, 2022.
(Continued)

*Primary Examiner* — Justin V Lewis
(74) *Attorney, Agent, or Firm* — Workman Nydegger

(57) ABSTRACT

A method for producing a data carrier includes a luminescent security element having at least two subregions, which at least do not completely overlap one another.

21 Claims, 3 Drawing Sheets

(56) References Cited

FOREIGN PATENT DOCUMENTS

WO 2017080654 A1 5/2017

OTHER PUBLICATIONS

International Search Report from corresponding PCT Application No. PCT/EP2022/025439, Feb. 16, 2023.
Berns, Roy S., "Billmeyer and Saltzman's Principles of Color Technology", 3rd Edition, John Wiley & Sons, Inc., Apr. 10, 2000, 8 pages.

* cited by examiner

METHOD FOR PRODUCING A DATA CARRIER HAVING A LUMINESCENT SECURITY ELEMENT, AND DATA CARRIER

BACKGROUND

The invention relates to a method for producing a data carrier having a luminescent security element, and a data carrier having a luminescent security element producible using such a method.

Data carriers, such as value documents or identification documents, but also other valuable objects, such as trademark articles, are often provided with security elements for security, which permit the authenticity of the data carrier to be checked and which at the same time are used as protection from unauthorized reproduction. Using luminescent materials to secure value documents or identification documents is known in this context. The presence of the luminescent materials can then be checked, for example, with the aid of a UV lamp.

For example, security imprints having multiple areas which display the same color impression under white light, but display different color impressions in luminescence upon additional UV excitation, are known from document EP 1 567 358 B2. However, a specified color impression cannot be emulated in luminescence using such devices, on the one hand because the perceived color impression changes with the mixing proportion of white light and UV light, and on the other hand because it is also not defined when a correspondence exists between a luminescence color impression and a remission color impression, and moreover because it is not disclosed how such a correspondence could be achieved practically if necessary.

In addition, it is known that the color impressions of luminescent printing inks generally change due to aging and environment, and both the intensities and the color impressions of various luminescences can change at different speeds. Therefore, motifs which can be easily recognized by an observer on the basis of their color impression or their color combination cannot be represented using conventional luminescence features of security elements, such as white color areas or combinations of national colors.

SUMMARY

Proceeding therefrom, the invention is based on the object of overcoming the disadvantages of the prior art and in particular specifying a data carrier having a luminescent security element having a high level of security from forgery and an attractive visual appearance. The invention is also to specify an advantageous method for producing such a data carrier.

The invention includes a method for producing a data carrier having a luminescent security element having at least two subregions, which at least do not completely overlap one another.

In the method, a desired target color location is initially specified in a step Z).

In a step B1), a first printing ink is provided, which upon illumination using white light generates a first color impression and upon illumination using excitation light having an excitation light spectrum has a first visible luminescence and generates a second color impression, which corresponds to the specified target color location.

In a step B2), a second printing ink is provided, which upon illumination using white light also generates the first color impression and upon illumination using excitation light, in particular using excitation light having the excitation light spectrum, has a second visible luminescence and generates a third color impression, which has a different color location and/or a different brightness than the second color impression of the first printing ink. In step B1) and B2) as the first and second printing ink, printing inks are provided, the remission and luminescence of which each display an essentially equally high stability to environmental influences.

In a step D), the luminescent security element is produced on the data carrier, wherein a first subregion is printed on the data carrier using the first printing ink and a second subregion, which at least does not completely overlap the first subregion, is printed on the data carrier using the second printing ink. This preferably comprises designs in which initially a carrier material, such as a thread or a planchette, is printed and then the printed carrier material is introduced into the data carrier or applied thereon.

When reference is made hereinafter to excitation light, this in particular means excitation light having the excitation light spectrum. Excitation light having the excitation light spectrum is always used in particular for the excitation of the first, second, and possibly further subregions or printing inks.

The requirement that two subregions do not completely overlap one another includes designs in which the subregions partially overlap one another, designs in which the subregions do not overlap but adjoin one another, and designs in which the subregions do not overlap and are arranged spaced apart. Designs in which the subregions are microscopically structured, for example, in the form of a point grid and—without printing layers lying one on top of another—are intermeshed so that upon observation with the naked eye from a distance of, for example, 50 cm, a color impression is generated, to which both subregions contribute, in contrast, are considered to be overlapping.

The phrase that the remission and luminescence of the two printing inks each display an essentially equally high stability to environmental influences means in the scope of this description that the stability of the remission of the two printing inks is essentially equally high, and that independently thereof the stability of the luminescence of the two printing inks is essentially equally high.

A data carrier is, for example, a printed product, in particular a document, a package, or a label, a printed trademarked product, or a digital storage element. In a preferred embodiment, the data carrier is a high-security value document such as a banknote, a chip card, or an ID.

Not only a target color location for the first printing ink upon illumination with the excitation light is advantageously specified, but also a second target color location for the second printing ink upon illumination using the excitation light is specified and accordingly a printing ink is provided as the second printing ink which, upon illumination using the excitation light, has a second visible luminescence and generates a color impression which corresponds to the specified second target color location. If the security element is created with the aid of further luminescent printing inks, a target color location is thus advantageously also specified for the further printing ink(s) upon illumination using the excitation light and one or more printing inks are provided as further printing inks which, under excitation illumination or excitation light, in particular using the excitation light having the excitation light spectrum, generate a color impression which corresponds to the respective specified target color location.

The first color impression upon illumination using white light is not limited in the scope of the invention, it can be any color impression, for example, a yellow, red, green, blue, or black color impression. A white color impression upon illumination using white light is also possible in the scope of the invention, but preferably, upon illumination using white light, the first color impression of the printing inks differs from the color impression of a substrate, in particular a paper substrate of the data carrier. In one advantageous embodiment, a remission target color location is specified for the first color impression and those first and second printing inks are provided, the color impression of which upon illumination using white light corresponds to the specified remission target color location. The wording that a first and a further printing ink both gencrate a first color impression upon illumination using white light means in particular that the color location of the first printing ink upon illumination using white light and the color location of the further printing ink upon illumination using white light have a color distance ΔE of at most 3, preferably of at most 1.

In one preferred embodiment, the second printing ink has a different color location upon illumination using the excitation light than the first printing ink, that is, the brightnesses of the luminescences are different not only at the same color location. A particularly large difference can thus be achieved in the visual impression of the two printing inks and the two subregions upon illumination using the excitation light.

Both the second color impression of the first printing ink upon illumination using the excitation light and the third color impression of the second printing ink upon illumination using the excitation light advantageously differ from the first color impression which is generated upon illumination using white light. A noticeable color contrast is thus achieved between the appearance of the security element in white light and the appearance upon illumination using the excitation light.

In one advantageous procedure, a fluorescent printing ink is provided as the first printing ink and a phosphorescent printing ink is provided as the second printing ink or vice versa. The printing inks and the printed subregions then differ not only in the brightness or the color location upon illumination using the excitation light, but also the decay time of the luminescence. The difference of the decay times can be used as a further authenticity characteristic.

In one advantageous embodiment, in step Z), the specified target color location is selected from white, blue, turquoise, violet, and/or the mixed colors thereof. In particular, the first printing ink appears white upon illumination using the excitation light, particularly preferably brighter than the color impression of a substrate, in particular a paper substrate of the data carrier. In the case of a white color impression under illumination using the excitation light, a possible color cast of the luminescent materials used due to aging or environmental influences is also easily recognizable by a layperson, so that the security element can only be successfully reconstructed with difficulty. A luminous white, which even appears brighter or whiter than the color impression of a non-luminescent paper substrate, is very noticeable and has a high attention and recognition effect for an observer.

At least one of the luminescent printing inks preferably comprises a luminescent material, the luminescence of which under the excitation illumination or illumination using the excitation light, in particular using the excitation light having the excitation light spectrum, generates a blue color impression or has a dominant wavelength between 380 nm and 500 nm. The dominant wavelength of a luminescence emission is defined here as the weighted arithmetic mean of the wavelengths, weighted using their luminescence intensities. This enables the generation of security features which are particularly visually noticeable having high recognition value, which in addition are difficult to forge due to the limited availability of blue emitting luminescent materials, thus are particularly secure.

In the method, a security element is advantageously produced, which displays different motifs upon illumination using white light and upon illumination using the excitation light. In particular, a security element is produced which upon illumination using white light displays a homogenous color area and/or which upon illumination using the excitation light displays a flag, a national symbol, or a nature motif, in particular a nature motif having a white subregion. A homogenous color area is also understood in the scope of the invention as a structured, monochromatic area, for example, consisting of a point grid, a line structure, such as guilloche patterns, or a microtext, if the color area creates a homogeneous color impression upon observation with the naked eye from a distance of, for example, 50 cm. Such motifs offer a particularly high level of security from forgery, since color deviations due to different aging or reaction of different strengths to environmental influences can be immediately recognized by an observer therein.

In one refinement of the method, it is advantageously provided that in a step B3), a third, non-luminescent printing ink is provided, which upon illumination using white light also generates the first color impression and the remission of which has an essentially equally high stability to environmental influences as the remission of the first and second printing ink, and in step D), a third subregion of the security element, which at least does not completely overlap with the first and second subregion, is printed on the data carrier using the third printing ink. The third subregion therefore appears in white light having the same color impression as the first and second subregion, but does not luminesce and therefore represents a dark or black subregion in the luminescent motif. The color and brightness range that can be represented in luminescence can thus be significantly enlarged.

In another, also advantageous refinement of the method, it is provided that in step B1), a fluorescent printing ink is provided as the first printing ink in a step B4), a fourth, phosphorescent printing ink is provided, which upon illumination using white light also generates the first color impression and upon illumination using excitation light, in particular using the excitation light having the excitation light spectrum, has a fourth visible luminescence and generates the same second color impression as the first printing ink, and the remission and luminescence of which display an essentially equally high stability to environmental influences as those of the first and second printing ink, and in step D), a fourth subregion of the security element, which at least does not completely overlap with the first and second and possibly third subregion, is printed on the data carrier using the fourth printing ink. The fourth and the first subregion are advantageously formed here adjoining one another or at least partially overlapping one another.

The fourth and the first subregion in this embodiment have the same second color impression under illumination using the excitation light, but are produced using different luminescent printing inks, namely one fluorescent and one phosphorescent printing ink. On the one hand, the recreation of such a design is technically very complex, on the other hand, detecting a lack of color correspondence of the two subregions is possible without problems even for a layperson, since the human eye can perceive even minor color differences well, in particular if they occur in adjoining color areas.

In a further, also advantageous refinement of the method, it is provided that in a step B5), a fifth, non-luminescent printing ink is provided, which upon illumination using white light generates a color impression that corresponds to the specified target color location, and in step D), a fifth subregion of the security element is printed on the data carrier using the fifth printing ink, which subregion at least does not completely overlap with the first and second and possibly the further subregion(s).

The fifth printing ink thus has, upon illumination using white light, a color impression having the same color location as the first printing ink upon illumination using the excitation light. The fifth subregion can thus be used as a remission color reference for the second color impression of the first printing ink upon illumination using the excitation light.

In one advantageous method variant, the luminescence color impression of the luminescent printing inks used is matched to illumination using an exclusively nonvisible excitation light without white light component, in particular a UV illumination. Alternatively, also advantageously, the luminescence color impression of the luminescent printing inks used can be matched to an excitation light having a predetermined mixture of nonvisible illumination and white light illumination. The nonvisible illumination can also in particular be a UV illumination here. The variant to be preferred for the matching is dependent in particular on the desired or expected observation conditions of the security element.

At least one of the luminescent printing inks is advantageously provided as a mixture of multiple luminescent materials. In particular, it can advantageously be provided that a printing ink having a first luminescent material is provided as the second printing ink and a printing ink having a mixture of the first luminescent material and a second luminescent material is provided as the first printing ink. In particular luminescent pigments, advantageously the encapsulated luminescent pigments described hereinafter, advantageously come into consideration as luminescent materials. Mixtures of at least two, preferably at least three, in particular precisely three, luminescent pigments are advantageous here, as explained in more detail hereinafter.

According to one particularly preferred procedure, at least the first and second printing ink, preferably all luminescent printing inks of the security element, are provided as printing inks having encapsulated luminescent pigments, which each comprise a core having an organic or organometallic luminescent material and a jacket encapsulating the core.

The luminescent pigments of the pigment systems described in document WO 2017/080654 A1 are advantageously used as the encapsulated luminescent pigments, the disclosure of which is insofar incorporated in the present application. The encapsulated luminescent pigments described in WO 2017/080654 A1 are distinguished by an essentially equal chemical stability, in particular to organic solvents, aqueous acids, aqueous bases, and aqueous redox-active solutions, even upon use of differently luminescing pigments, the desired, essentially equally high stability of the luminescence to environmental influences can be obtained.

In the scope of this invention, an essentially equally high stability of the luminescence of two luminescent pigments to environmental influences is understood to mean that the luminescence of the two pigments on the one hand has an essentially equally high chemical stability, in particular that for both pigments, upon an exposure for 5 minutes to toluene, ethyl acetate, hydrochloric acid (5%), sodium hydroxide (2%), sodium hypochlorite solution (5% active chlorine), and acetone, the luminescence intensity remaining after the test is higher than 80% of the initial intensity, and that the luminescence of the two pigments, on the other hand, has essentially the same light fastness, in particular after irradiation according to wool scale step 3 for both pigments, in each case at least 50% of the initial luminescence intensity remains and the remaining luminescence intensities differ by less than 30 percentage points.

Reference is made to WO 2017/080654 A1 for details of the test method. It is ensured by such an equal and high stability of the luminescence to environmental influences that upon a mixture of multiple pigments or upon a combination of multiple pigments in adjacent printing regions, no aging-related changes of the luminescence intensity or the color impression occur upon illumination using the excitation light.

Two printing inks having the same color impression upon illumination using white light or the same remission color impression have in the scope of this invention an essentially equally high stability of the remission color impression to environmental influences when the remission of the two pigments, on the one hand, has an essentially equally high chemical stability, in particular if the color distance of the remission of both pigments after an exposure for 5 minutes to toluene, ethyl acetate, hydrochloric acid (5%), sodium hydroxide (2%), sodium hypochlorite solution (5% active chlorine), and acetone still has a color distance $\Delta E$ of at most 3, preferably at most 1, and that the remission of the two pigments, on the other hand, has essentially the same light fastness, in particular that the color distance of the remission of both pigments after illumination according to wool scale 3 still has a color distance $\Delta E$ of at most 3, preferably at most 1.

The material of the jacket of the encapsulated luminescent pigments is advantageously selected from amino plastics, phenol resins, melamine-formaldehyde resins (MF), melamine-phenol-formaldehyde resins (MPF), phenol-formaldehyde resins (PF), urea-formaldehyde resins (UF), melamine-guanidine-formaldehyde resins, or phenol-resorcinol-formaldehyde resins, or the encapsulated luminescent pigments comprise a thermoset matrix, and a plurality of core particles embedded therein made of a thermoplastic polymer.

In order in step B1) to provide the first printing ink with the desired color impression under illumination using the excitation light, the following procedure can advantageously be used:

First, in step Z), the desired target color location is specified by tristimulus value proportions x, y. Furthermore, in a step L), at least two, in particular at least three, luminescent pigments are specified using their luminescence spectra, wherein the luminescent pigments preferably do not have a body color, and in a step R), a remission color pigment is specified using a remission spectrum and a remission color pigment pigmentation—in this case, the remission color pigment can also be a specified mixture of multiple remission color pigments. Furthermore, in a step LB), relative weight proportions of the at least two luminescent pigments are determined from the luminescence spectra of the luminescent pigments, the remission spectrum of the remission color pigment, the CIE spectral value functions, in particular according to DIN EN ISO 11664-1, and the specified target color location. Furthermore, in a step LM), the at least two luminescent pigments are mixed in the relative weight proportions determined in step LB) and introduced together with the remission color pigment into a clear lacquer, in order to obtain the first printing ink, the color location of which upon illumination using the excitation light essentially corresponds to the desired target color location and the color impression of which upon illumination using white light corresponds to the color impression of the remission color pigment. In particular, the color impression of the printing ink upon illumination using white light and the color impression of the printing ink upon illumination using the excitation light can be specified and set separately from one another.

Preferably, at least three, in particular precisely three, luminescent pigments are used in this procedure. Depending on the desired target color location, the relative weight proportions determined in step LB) for one or more of the luminescent pigments can also be zero, so that the mixture can also only contain two luminescent pigments or even only one luminescent pigment.

In the provision of the first printing ink, the luminescence spectra of the luminescent pigments, the remission spectrum of the remission color pigment, and the CIE spectral value functions are advantageously each specified as a vector of n intensities at n defined wavelengths. The length of the spectral vectors can be, for example, n>=10, in particular n=50 or n=100. Furthermore, it is advantageously provided that in step LB):

LB1) color valences X', Y', Z' are determined from the tristimulus value proportions x, y of the specified target color location, LB2) a standard light sensitivity matrix is determined from the CIE spectral value functions, LB3) the standard light sensitivity matrix is inverted to obtain an inverse standard light sensitivity matrix, and LB4) from the inverse standard light sensitivity matrix, the color valences X', Y', Z' of the specified target color location, the remission spectrum of the remission color pigment, and the luminescence spectra of the at least two luminescent pigments, the relative weight proportions of the at least two luminescent pigments are determined.

Alternatively or additionally, it can be provided in step LM) that

LM1) an overall pigmentation of the luminescent pigments or a maximum pigmentation of one of the luminescent pigments is specified and thus the absolute weight proportions of the at least two luminescent pigments are determined from the relative weight proportions determined in step LB), and LM2) the at least two luminescent pigments are mixed with the absolute weight proportions determined in step LM1) and introduced together with the remission color pigment having the specified remission color pigment pigmentation into a clear lacquer in order to obtain the luminescent first printing ink.

In one refinement, it is provided in the provision of the first printing ink that in step Z), in addition to the desired target color location, a desired tolerance color distance to the target color location is specified, in step LB), with further use of the specified tolerance color distance, a tolerance weight range is determined in each case for the relative weight proportion of each of the at least two luminescent pigments, and in step LM), the at least two luminescent pigments are mixed in weight proportions which are within the tolerance weight ranges for the luminescent pigments in order to obtain a luminescent printing ink having a luminescence, the color location of which under illumination using the excitation light is within the specified tolerance color distance to the specified target color location.

In this refinement, it is advantageously furthermore provided that in step LB)

LB0) from the specified target color location and the specified tolerance color distance, in particular assuming equal brightness, at least two, preferably at least four, limiting color locations having tristimulus value proportions xG, yG are determined, and for each limiting color location LB1') from the tristimulus value proportions xG, yG of the limiting color location, associated color valences $X_G'$, $Y_G'$, $Z_G'$ are determined, LB4') from the inverse standard light sensitivity matrix, the determined color valences $X_G'$, $Y_G'$, $Z_G'$ of the limiting color location, the remission spectrum of the remission color pigment, and the luminescence spectra of the at least two luminescent pigments, associated relative weight proportions of the at least two luminescent pigments are determined, and then LB5') from the relative weight proportions of the at least two luminescent pigments for the limiting color locations, a tolerance weight range is determined for the relative weight proportion of each of the at least two luminescent pigments.

If a target color location is also specified for the second printing ink or for further luminescent printing inks, a corresponding method can advantageously be used to provide the second printing ink or the further printing inks.

The invention also includes a data carrier having a luminescent security element having at least two subregions, which is producible according to the above-described method. In a first subregion, a first printing ink is applied to the data carrier, which, upon illumination using white light, generates a first color impression, and, upon illumination using the excitation light, has a first visible luminescence and generates a second color impression, which corresponds to a specified target color location. In a second subregion, which at least does not completely overlap the first subregion, a second printing ink is applied to the data carrier, which, upon illumination using white light, also generates the first color impression and, upon illumination using the excitation light, has a second visible luminescence and generates a third color impression, which has a different color location and/or a different brightness than the second color impression of the first printing ink. The remission and luminescence of the first and second printing ink each display an essentially equally high stability to environmental influences.

Advantageously, both the second color impression of the first printing ink upon illumination using the excitation light and the third color impression of the second printing ink upon illumination using the excitation light differ from the first color impression of both printing inks upon illumination using white light.

In one advantageous embodiment, the first printing ink is a fluorescent printing ink and the second printing ink is a phosphorescent printing ink, or vice versa.

The specified target color location of the first printing ink upon illumination using the excitation light is advantageously selected from white, blue, turquoise, violet, and/or the mixed colors thereof. In particular, it is provided here that the second color impression of the first printing ink upon illumination using the excitation light appears white and thereby brighter than the color impression of a substrate, in particular a paper substrate of the data carrier.

The security element advantageously displays different motifs upon illumination using white light and upon illumination using the excitation light. In particular, it is advantageously provided that the security element, upon illumination using white light, displays a homogeneous color area and/or that the security element, upon illumination using the excitation light, displays a flag, a national symbol, or a nature motif, in particular a nature motif having a white subregion.

In one advantageous refinement of the data carrier, it is provided that in a third subregion of the security element, which at least does not completely overlap the first and second subregion, a third printing ink is applied, which upon illumination using white light also generates the first color impression and the remission of which displays an essentially equally high stability to environmental influences as the remission of the first and second printing ink.

According to another advantageous refinement of the data carrier, it is provided that the first printing ink is a fluorescent printing ink, and that in a fourth subregion of the security element, which at least does not completely overlap the first and second and possibly third subregion, a fourth phosphorescent printing ink is applied, which upon illumination using white light also generates the first color impression, and upon illumination using the excitation light has a fourth visible luminescence and generates the same first color impression as the first printing ink, and the remission and luminescence of which each display an essentially equally high stability to environmental influences as those of the first and second printing ink.

In another advantageous refinement of the data carrier, it is provided that in a fifth subregion of the security element, which at least does not completely overlap the first and second and possibly the further subregion(s), a fifth, non-luminescent printing ink is applied, which upon illumination using white light generates a color impression, the color location of which corresponds to the specified target color location and in particular corresponds to the color location of the second color impression of the first printing ink upon illumination using the excitation light.

At least one of the luminescent printing inks of the security element advantageously represents a mixture of multiple luminescent materials. In particular, the second printing ink can represent a printing ink having a first luminescent material and the first printing ink can represent a mixture of the first luminescent material and a second luminescent material.

Particularly advantageously, at least the first and second printing ink, preferably all luminescent printing inks of the security element each represent printing inks having encapsulated luminescent pigments, which comprise a core having an organic or organometallic luminescent material and a jacket encapsulating the core. Advantageously, the luminescent pigments already described in more detail above of the pigment system described in document WO 2017/080654 A1 are used as the encapsulated luminescent pigments.

BRIEF DESCRIPTION OF THE DRAWINGS

Further exemplary embodiments and advantages of the invention are explained hereinafter on the basis of the figures, the representation of which is not an illustration to scale or proportional, in order to enhance the clarity.

In the Figures.

DETAILED DESCRIPTION OF VARIOUS EMBODIMENTS

The invention will now be explained on the basis of the example of banknotes and other value documents having luminescent security elements. For this purpose, FIGS. 1(*a*) and 1(*b*) show a schematic representation of a banknote 10 having a paper substrate 12 and a luminescent security element 14 printed on the paper substrate 12.

Figure 1A:
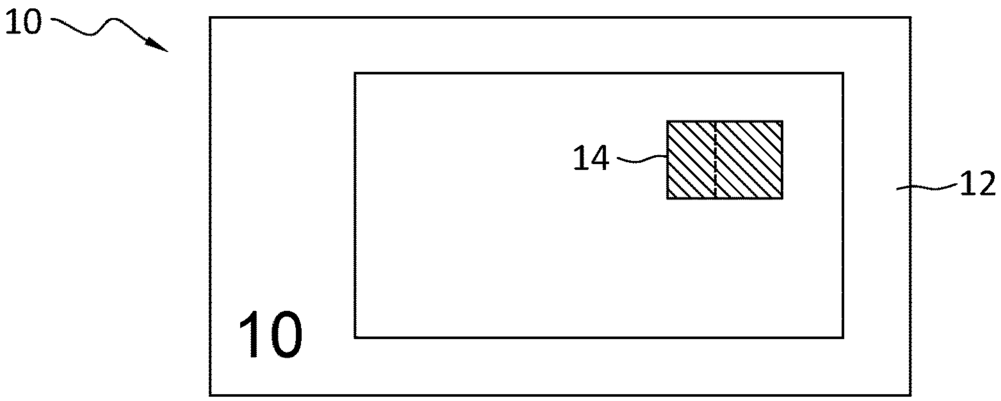
FIGS. 1(*a*) and 1(*b*) shows a schematic representation of a banknote having a security element according to an exemplary embodiment of the invention, wherein FIG. 1(*a*) shows the appearance in white light and FIG. 1(*b*) shows the appearance after excitation using nonvisible excitation light, in particular UV light.
Figure 1B:
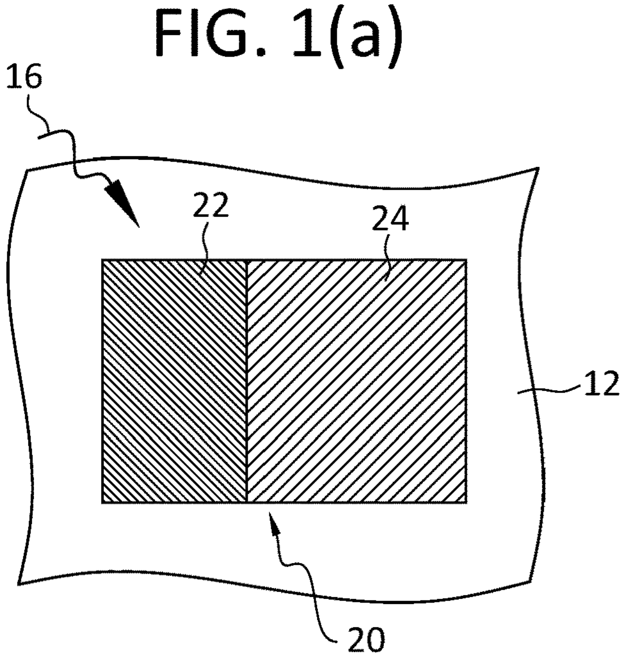

Upon observation in white light, the security element 14 appears as a homogeneous, monochromatic area having a first color impression, as illustrated in FIG. 1(*a*). The dashed line separates two areas having different printing inks, which generate the same color impression in white light, however, and therefore form a homogeneous, monochromatic area for the observer.

Upon illumination using nonvisible excitation light, for example UV light 16, the security element 14 luminesces and displays a multicolored luminescent motif 20, which has different color impressions in different subregions 22, 24, as shown in FIG. 1(*b*). The luminescent motif 20 represents, for example, a national flag or also another motif, the color impression of which can easily be identified as correct or incorrect by an observer even without color reference.

The subregions 22, 24 are each printed using a printing ink, the remission and luminescence of which has a high stability to environmental influences, wherein the special feature therein is that the remission and luminescence of the two printing inks used for the subregions 22, 24 each display an essentially equally high stability to environmental influences. Both the remission color impression and the luminescence color impression of the two subregions 22, 24 therefore hardly change due to unavoidable aging and environmental influences, and in any case change in the same manner due to the essentially equally high stability to environmental influences. Color shifts of the subregions 22, 24 caused by aging and environmental influences are thus minimized or even completely avoided both upon illumination using white light and upon illumination using the excitation light, so that the original correctly set overall color impression of the luminescent motif 20 is also retained over the lifetime of the banknote 10. This enables in particular a motif such as a national flag to be used as the luminescent motif 20, the color correctness of which can also be readily identified by a layperson.

If, on the other hand, as with conventional luminescent printing inks, the stability of the printing inks used for various color impressions differs, a desired color effect of a luminescent motif cannot be set correctly, since the color location of the different luminescences changes in an uncontrolled manner due to aging and environmental influences. This in particular prevents the use of national flags or national symbols as luminescent motifs and forces the use of synthetic and less esthetically appealing designs.

In addition, it is normally already difficult to set the color location of luminescent inks upon illumination using excitation light as specified in order to reproduce a specified motif, such as a national flag, with color fidelity in the luminescence. To overcome this difficulty, the procedure described hereinafter can advantageously be used in the scope of the present invention. The described procedure follows the teaching of German patent applications DE 102021002764.7 and DE 102021002759.0 of the same applicant, the content of the disclosure of which is insofar incorporated in the present application.

First, for each of the subregions 22, 24, a target color location is specified for the color impression upon illumination using the excitation light. For national flags and other national symbols, the required target color locations are well defined and are generally known for various color space models. If the target color location should correspond to the color location of a specified remission color, its color location can be determined, for example, by a spectrophotometric measurement. Furthermore, a remission target color location is specified for the color impression upon illumination using white light, which is the same for the subregions 22, 24. In particular, the remission target color location can be selected independently of the target color location for the color impression upon illumination using excitation light.

The specified target color location for the color impression upon illumination using the excitation light is then initially expressed by tristimulus value proportions x, y. This takes the fact into consideration that, for example, a spectrophotometric measurement of the standard valences X, Y, and Z is always related to a standard illumination from which the white reference also results. Since a standard illumination and a white reference are not defined for luminescent inks, standard valences or other equivalent color space systems cannot be used for luminescent inks.

In the present case, the tristimulus value proportions x, y, and z are therefore used, which are defined starting from the standard valences by $$x = X/(X+Y+Z),\ y = Y/(X+Y+Z),\ z = Z/(X+Y+Z).$$

If the specified target color location is given in a different color space system, for example in the RGB color space or in the CMYK color space, the specified target color location can be converted in a known manner into standard valences and expressed from there in tristimulus value proportions. The specification of the tristimulus value proportions x and y is sufficient, since the tristimulus value proportion z is fixed by the standardization x+y+z=1.

For the further procedure, reference is made to the color valences X', Y', Z' without standardization, which are proportional to both the standard valences X, Y, Z, and to the tristimulus value proportions x, y, z.

Furthermore, three or more luminescent pigments having specific base luminescent colors are selected, which are to be used to generate the specified target color location upon illumination using the excitation light and the luminescence spectra of which are known. Preferably, one of the luminescent pigments, under illumination using the excitation light, generates a blue color impression or has a dominant wavelength between 380 nm and 500 nm. For example, three luminescent pigments can be used for the primary colors red, green, and blue. The primary luminescence colors are, for example, phosphorescent colors and are preferably colorless under visible illumination and luminesce visibly under illumination using the excitation light, in particular UV light. Furthermore, a remission color pigment is provided, the remission color impression of which corresponds to the remission target color location, and a remission color pigment pigmentation. The remission color pigment has a remission spectrum $S_{Rem}$.

If three luminescent pigments are used for the primary colors red, green, and blue for the illustration, the relative weight proportion of the luminescent pigments can be described by a metering vector $c=(C_R, C_G, C_B)^T$, wherein the superscript T indicates a transposition.

Spectra are each described in the present case as a vector of n intensities at defined wavelengths, and the spectral vectors of the luminescence spectra of the three selected luminescent primary colors are combined to form an n×3 matrix, the so-called primary color matrix R. The mixed luminescence spectrum $S_{Lum}$ of the luminescent printing ink obtained from the mixture of these three luminescent pigments is then determined by multiplication of the primary color matrix R by the metering vector c, $S_{Lum}=R\cdot c$.

If the printing ink also contains, in addition to the three luminescent pigments having the weight proportions given by the metering vector c, the remission color pigment, it displays, under illumination using the excitation light, an emission having a combination spectrum $S_{tot}$, to which both the mixed luminescence spectrum $S_{Lum}$ of the luminescent pigments and the remission spectrum $S_{Rem}$ of the remission color pigment contribute, in particular the combination spectrum corresponds to a component by component multiplication of the remission spectrum and the mixed luminescence spectrum: $S_{tot}=S_{Lum}\cdot S_{Rem}$.

The color valences X', Y', Z' of this printing ink upon illumination using the excitation light are obtained from the combination spectrum $S_{tot}$ by decomposition into the CIE spectral value functions. From the three CIE spectral value functions, a 3×n matrix, the standard light sensitivity matrix W, is formed, and the combination spectrum $S_{tot}$ is multiplied by this standard light sensitivity matrix W.

By inverting these operations, from the specified target color location (X', Y', Z'), the metering vector c and thus the relative weight proportions can be determined, in which the three selected luminescent pigments have to be mixed in order—in combination with the remission color pigment— to obtain a luminescent printing ink, the color impression of which upon illumination using the excitation light just corresponds to the specified target color location (X', Y', Z'). In particular, the color impression of the printing ink upon illumination using the excitation light and the color impression of the printing ink upon illumination using white light can be set independently of one another.

By suitable scaling, for example, by defining the pigmentation of the luminescent pigment occurring in the highest concentration, or by defining the overall pigmentation, absolute weight proportions for the pigmentation of the printing ink can be obtained therefrom. For further details and background of the procedure, reference is made to the abovementioned German patent applications DE 102021002764.7 and DE 102021002759.0.

The described procedure can be carried out for all subregions 22, 24 of the luminescent motif 20, in particular using the same remission color pigment, so that as a result a set of luminescent printing inks is determined, the color impression of which upon illumination using the excitation light corresponds in each case to the specified target color location of one of the subregions of the luminescent motif and corresponds to its remission color impression. Using this set of luminescent printing inks, the luminescent motif 20 of FIGS. 1(*a*) and 1(*b*) is printed, and thus the desired true-color representation of the national flag is achieved upon illumination using the excitation light. Due to the essentially equally high stability of the luminescence of the printing inks to environmental influences, this true-color representation is also retained during the life of the banknote 10. Because of the equally high stability of the remission of the printing inks to environmental influences, the subregions 22, 24 also do not display aging-related color deviations under white light, so that the security element always appears as a homogeneous, monochromatic area in white light.

For example, the security element 14 of FIGS. 1(*a*) and 1(*b*) can appear under white light as a homogeneous, yellow area, while the subregion 22 appears green and the subregion 24 appears red under UV illumination. The precise color locations of the subregions under UV illumination are specified in accordance with the desired national flag representation, as explained in more detail below.

The printing inks for the subregions 22, 24 contain in the exemplary embodiment, on the one hand, luminescent pigments which are colorless under illumination using white light and, on the other hand, remission color pigments colored upon illumination using white light. Remission color pigments are sometimes also designated in the scope of this description as body color pigments.

The first and second printing ink advantageously contain the same remission color pigments. Since the luminescent pigments preferably do not have a body color, it is thus ensured that the subregions printed using the first or second printing ink have the same color impression under white light. The use of the same remission color pigments also ensures that the stability of the remission of the first and second printing ink to environmental influences is equally high.

Figure 2:
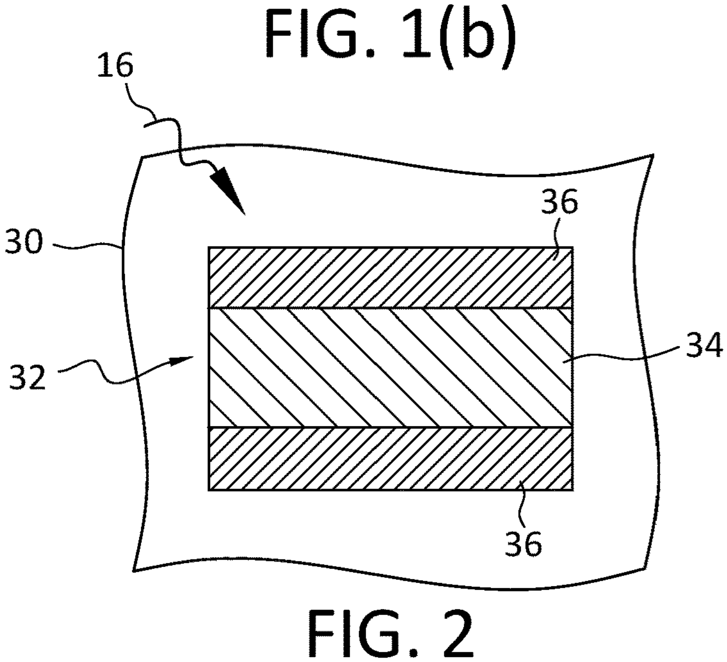
FIG. 2 shows the appearance of a value or identification document having a security element according to another exemplary embodiment upon excitation using UV light.

FIG. 2 illustrates a further exemplary embodiment of the invention, in which a security element 32 having two subregions 34, 36 is printed on a substrate of a value or identification document 30. In white light, the area of the security element appears with homogeneous, monochromatic color impression (not shown), FIG. 2 illustrates the appearance of the security element 32 upon excitation using UV light 16. The subregion 34 then displays a yellow color impression, the subregion 36 consisting of two spaced-apart partial regions displays a red color impression. The subregions 34, 36 are printed using printing inks, the remission and luminescence of which each display a high and in particular an essentially equally high stability to environmental influences. The yellow luminescent printing ink contains, for example, a mixture of a red luminescent material and a green luminescent material, wherein the precise relative concentrations are determined in the above-described manner in order to obtain a specified target color location for the yellow color impression under UV illumination.

To also achieve an equally high stability of the luminescence of the printing inks used to environmental influences, in particular the encapsulated luminescent pigments of the pigment systems described in WO 2017/080654 A1 can be used as the luminescent pigments. The encapsulated luminescent pigments described in WO 2017/080654 A1 each have a core having an organic or organometallic luminescent material and a jacket encapsulating the core and are distinguished by an essentially equal chemical stability, in particular to organic solvents, aqueous acids, aqueous bases, and aqueous redox-active solutions. The same jacket material is advantageously used for each of the encapsulated luminescent pigment types used. This ensures the equal chemical stability.

The required concentrations of the encapsulated luminescent pigments in the printing inks for the subregions 22, 24 are selected in accordance with the desired color impression of the associated subregion under UV illumination on the basis of the luminescence spectra of the encapsulated luminescent pigments, as already described in principle above.

Figure 3:
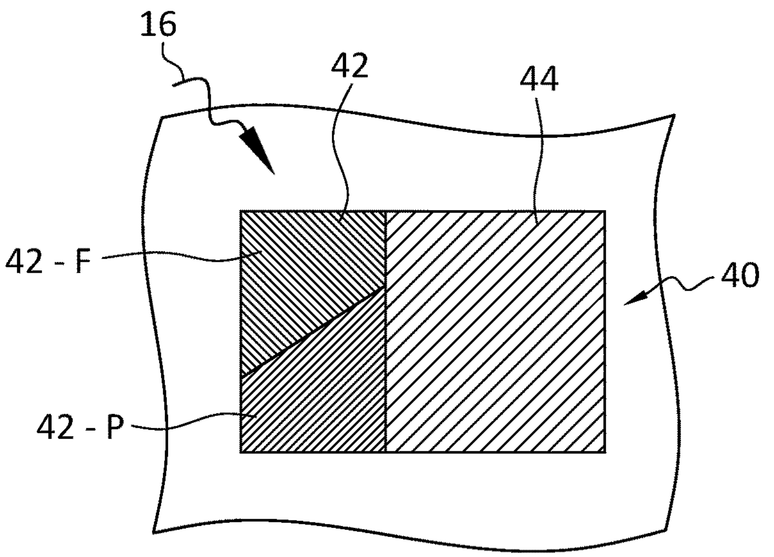
FIG. 3 shows the appearance of a refinement of the design of FIGS. 1(*a*) and 1(*b*) in UV light.

FIG. 3 shows a refinement of the design of FIGS. 1(*a*) and 1(*b*) as a further exemplary embodiment. The security element 40 of FIG. 3, which is printed on a banknote paper 12, displays the same national flag as the security element of FIGS. 1(*a*) and 1(*b*) as a luminescent motif under UV illumination and for this purpose in particular contains a green luminescent subregion 42 and a red luminescent subregion 44, wherein both subregions have the same color impression in white light and the security element 40 thus appears as a homogeneous, monochromatic area under white light.

In contrast to the design of FIGS. 1(*a*) and 1(*b*), the green luminescent subregion 42 consists in the design of FIG. 3 of two adjoining partial regions 42-F, 42-P, wherein the partial region 42-F is printed using a green fluorescent printing ink and the partial region 42-P is printed using a green phosphorescent printing ink. The partial region 42-F therefore illuminates only during the irradiation using UV light 16, while the partial region 42-P also illuminates for some time after ending the UV excitation.

In such a design, it is important for the printing inks for the partial regions 42-F, 42-P to be exactly matched to one another in order to generate the same green color impression upon illumination using the excitation light. This can be achieved, for example, using the above-described method with specification of the same green target color location. Furthermore, it is particularly important that the printing inks used for the partial regions 42-F, 42-P have an essentially equally high stability to environmental influences, so that the corresponding green color impression upon illumination using the excitation light is retained during the circulation of the banknote having the security element 40. The correspondence of the color impressions of the two partial regions 42-F, 42-P upon illumination using the excitation light and the maintenance thereof over time is even more important than the exact correspondence of the color impressions with the specified target color location, since a relative color deviation between the two partial regions 42-F, 42-P is more easily noticeable to an observer than a deviation of the represented green tone from a specified target color location.

The security element 40 of FIG. 3 has a particularly high level of security from forgery, since a recreation of the same green color impression under illumination using the excitation light using two different luminescent printing inks, namely one fluorescent and one phosphorescent printing ink, and ensuring that the correspondence of the two color impressions is retained in spite of aging and environmental influences is extraordinarily technically complex. On the other hand, detecting a lack of correspondence is possible without problems even for a layperson, since the human eye can easily perceive even small color differences in the adjoining color areas 42-F, 42-P.

The exemplary embodiments described hereinafter are used for illustration with a few specific pigment systems having encapsulated luminescent pigments and specific remission color pigments. The encapsulated luminescent pigments are based on the teaching of document WO 2017/080654 A1, the content of which is referred to for further details and the production of printing inks having such pigments.

Pigment System 1:

Pigment system 1 contains a red and a green encapsulated luminescent pigment having thermoplastic core and condensation polymer jacket according to exemplary embodiment 1 of document WO 2017/080654A1.

A core-jacket particle having a polymethyl methacrylate core and a melamine-formaldehyde jacket is used as the red luminescent pigment, which contains as the pigments dissolved in the core a mixture of the three pigments N-(2-(4-oxo-4H-benzo[d][1,3]oxazin-2-yl)phenyl) naphthalene-2-sulfonamide ($C_{24}H_{16}N_2O_4S$), 2,9-bis(2,6-diisopropylphenyl)-5,6,12,13-tetraphenoxyanthra[2,1,9-def: 6,5,10-d'e'f'] diisoquinoline-1,3,8, 10 (2H,9H)tetraone ($C_{72}H_{58}N_2O_8$), and Eu(TTA)$_3$ (TPPO)$_2$ (TTA=thenoyltrifluoroacetone; TPPO=triphenylphosphine oxide).

A core-jacket particle having a polymethyl methacrylate core and a melamine-formaldehyde jacket is used as the green luminescent pigment, which contains as the pigment dissolved in the core N-(2-(4-oxo-4H-benzo[d][1,3]oxazin-2-yl)phenyl) naphthalene-2-sulfonamide ($C_{24}H_{16}N_2O_4S$).

Pigment System 2:

Pigment system 2 contains a red and a green encapsulated luminescent pigment having thermoset core and condensation polymer jacket according to exemplary embodiment 2 of document WO 2017/080654A1.

A core-jacket particle having a polyurea core and a melamine-formaldehyde jacket is used as the red luminescent pigment, which contains as the pigments distributed or dissolved in the core a mixture of the three pigments N-(2-(4-oxo-4H-benzo[d][1,3]oxazin-2-yl)phenyl) naphthalene-2-sulfonamide ($C_{24}H_{16}N_2O_4S$) and 2,9-bis(2,6-diisopropylphenyl)-5,6,12,13-tetraphenoxyanthra[2,1,9-def: 6,5,10-d'e'f']diisoquinoline-1,3,8, 10 (2H,9H)tetraone ($C_{72}H_{58}N_2O_8$) and Eu(TTA)$_3$ (TPPO)$_2$ (TTA=thenoyltrifluoroacetone; TPPO=triphenylphosphine oxide).

A core-jacket particle having a polyurea core and a melamine-formaldehyde jacket is used as the green luminescent pigment, which contains as the pigment distributed or dissolved in the core N-(2-(4-oxo-4H-benzo[d][1,3]oxazin-2-yl)phenyl) naphthalene-2-sulfonamide ($C_{24}H_{16}N_2O_4S$).

Pigment System 3:

Pigment system 3 contains a blue and a green encapsulated luminescent pigment each having multiple thermoplastic cores and addition polymer jackets according to exemplary embodiment 3 of document WO 2017/080654A1.

A core-jacket particle having multiple polymethyl methacrylate cores and a polyurea jacket is used as the blue luminescent pigment, which contains as the pigment dissolved in the cores 2,5-thiophenediylbis(5-tert-butyl-1,3-benzoxazole).

A core-jacket particle having multiple polymethyl methacrylate cores and a polyurea jacket is used as the green luminescent pigment, which contains as the pigment dissolved in the cores N-(2-(4-oxo-4H-benzo[d][1,3]oxazin-2-yl)phenyl) naphthalene-2-sulfonamide ($C_{24}H_{16}N_2O_4S$).

Body Color Pigments:

Pantone Yellow, Pantone Green, Pantone Process Blue C, and Pantone Red are used as the body color pigments (remission color pigments).

Figure 4:
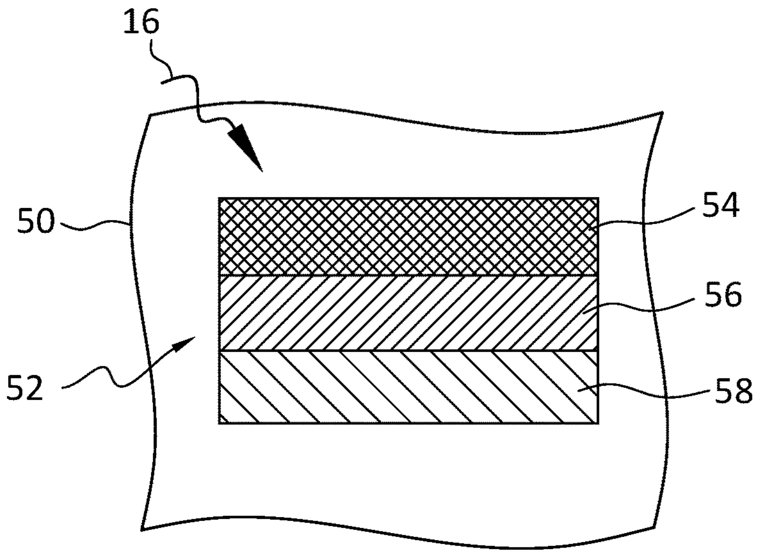
FIG. 4 shows the appearance of a security element printed on the substrate of a value or identification document according to a further exemplary embodiment in UV light.

Exemplary Embodiment of FIG. 4

FIG. 4 shows a security element 52, which is printed on the substrate of a value or identification document 50 and contains three different subregions 54, 56, 58. In white light, the surface of the security element 52 appears with a homogeneous, monochromatic color impression (not shown), FIG. 4 illustrates the appearance upon excitation using UV light 16. The subregion 56 displays a red color impression upon illumination using UV light and the subregion 58 displays a gold-yellow color impression, while the subregion 54 does not luminesce and therefore appears dark or black in UV light 16, so that the security element 52 displays a three-colored national flag black (regions without luminescence)-red-yellow.

The printing inks used for the partial regions 54, 56, 58 all contain the same remission color pigments, so that under white light they have the same color impression and also the same stability of the remission to environmental influences.

The printing ink for the subregion 54 does not contain luminescent pigments, the luminescent pigments of the printing inks of the partial regions 56, 58 are colorless under visible illumination and moreover are selected so that their luminescence displays a high and in particular essentially equally high stability to environmental influences.

Specifically, the red luminescent printing ink of the subregion 56 contains the body color pigment Pantone Process Blue C, and the red luminescent pigment contains abovementioned pigment system 2. Their color impression under UV illumination corresponds to the tristimulus value proportions (x,y)=(0.55, 0.32), the color impression of the remission under white light corresponds to the tristimulus value proportions (x,y)=(0.20, 0.27).

The yellow luminescent printing ink of the subregion 58 contains the body color pigment Pantone Process Blue C, and a mixture of the red and the green luminescent pigments of pigment system 2. The pigmentation of the luminescent pigments was determined with the aid of the abovedescribed procedures starting from an overall pigmentation of 15% to 12.3% pigmentation red and 2.7% pigmentation green such that under UV illumination a yellow color impression having tristimulus value proportions (x, y)=(0.37, 0.42) is achieved. The color impression of the remission under white light corresponds to the tristimulus value proportions (x,y) =(0.20, 0.27).

The non-luminescent printing ink of the subregion 54 contains the body color pigment Pantone Process Blue C without admixture of a luminescent material. The color impression of the remission of the non-luminescent printing ink under white light corresponds to (x,y)=(0.20, 0.27).

To produce the printing inks for the subregions 56, 58, the luminescent pigments were each introduced into the printing ink Pantone Process Blue C.

All three printing inks have the same color impression of the remission under white light with tristimulus value proportions (x,y)=(0.20, 0.27). Under illumination with UV light, however, corresponding to the desired national flag representation of the security element 52 owing to the luminescence, different, specifically selected color impressions (subregions 56, 68) or no luminescence (subregion 54) result. Since the luminescent pigments used have the same stabilities of the luminescence to chemical and physical attacks (see example 2d of WO 2017/080654 A1), the color impressions of the subregions 56, 58 remain stable under UV illumination over the lifetime of the value document.

Comparative Example to FIG. 4

In a comparative example to the design of FIG. 4, the red luminescent encapsulated luminescent pigment of pigment system 2, and a non-encapsulated green luminescent pigment based on N-(2-(4-oxo-4H-benzo[d][1,3]oxazin-2-yl) phenyl) naphthalene-2-sulfonamide ($C_{24}H_{16}N_2O_4S$) are used.

An imprint 52 having three regions is produced, which display the same blue color impression under white light and represent a three-colored national flag black (area without luminescence)-red-yellow under UV illumination.

The red luminescent printing ink and the non-luminescent printing ink of the regions 54, 56 of the comparative example correspond to those of the exemplary embodiment for FIG. 4. In contrast, the yellow luminescent printing ink of the comparative example contains the body color pigment Pantone Process Blue C, and a mixture of the red encapsulated and the green non-encapsulated luminescent pigments.

The pigmentation of the luminescent pigments was determined with the aid of the above-described procedure so that under UV illumination, a yellow color impression having tristimulus value proportions (x, y)=(0.37, 0.42) is achieved. The color impression of the remission under white light corresponds to the tristimulus value proportions (x,y)=(0.20, 0.27).

To produce the printing inks, the luminescent pigments were introduced into the printing ink Pantone Process Blue C.

In the comparative example too, all three printing inks have the same color impression of the remission under white light. Under UV light, they initially also display different, specifically selected color impressions or no luminescence.

However, the nonencapsulated green luminescent pigments are unstable to chemical attacks, for example, their luminescence intensity drops after approximately 30 minutes of action of acetone to nearly zero. The color impression thus shifts under UV illumination from the initially yellow luminescent printing ink of the subregion 58 to red; the originally represented national flag is then no longer recognizable as such and the contrast to the adjoining printing region of the red luminescent printing ink is significantly weaker.

Figure 5:
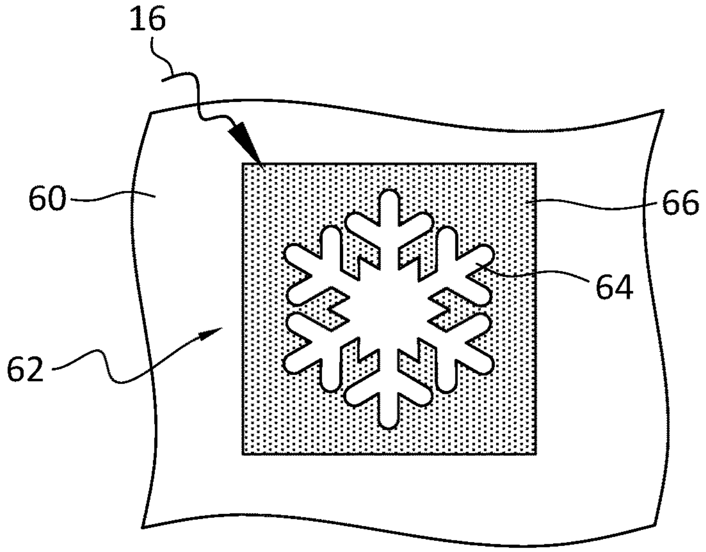
FIG. 5 shows the appearance of a security element printed on the paper substrate of a value document according to a further exemplary embodiment in UV light.

Exemplary Embodiment of FIG. 5

The design of FIG. 5 shows a security element 62 on a paper substrate 60 of a value document, which upon illumination using UV light 16 displays a nature motif, for example a white snowflake 64 in front of a blue sky background 66. In white light, the area of the security element 62 appears with homogeneous, monochromatic color impression (not shown). With such a nature motif, the observer can easily judge the correctness of the white color impression of the snowflake 64 under UV illumination even without color reference on the value document.

The printing inks of the subregions 64, 66 contain the same remission color pigments, so that in addition to the color impression under white light, the stability of the remission to environmental influences is also the same. The white color impression of the subregion 64 under UV illumination can be obtained by a suitable mixture of luminescent pigments lighting in red, green, and blue with equally high stability to environmental influences.

Specifically, for this purpose the blue and the green luminescent pigment of the pigment system 3 and a red luminescent pigment having the same core-jacket structure and the red luminescent pigment mixture from pigment systems 1 and 2 are used.

The blue luminescent printing ink contains the body color pigment Pantone Yellow, and the blue luminescent pigment of pigment system 3. Its color impression under UV illumination corresponds to the tristimulus value proportions (x,y) =(0.18, 0.23). The color impression of the remission under white light corresponds to (x,y)=(0.46, 0.48).

The white luminescent printing ink contains the body color pigment Pantone Yellow, and a mixture of the mentioned red, green, and blue luminescent pigments. According to the above-described procedure, the mixing ratio of the red, green, and blue luminescent pigments was determined as R:G:B=2.71:1:2.50 so that under UV illumination a white color impression with (x, y)=(0.35, 0.36) is achieved. With an overall pigmentation of 10%, a pigmentation of R=4.37%, G=1.61%, B=4.02% results therefrom for the respective luminescent pigments. The color impression of the remission under white light corresponds to (x,y)=(0.46, 0.48).

To produce the printing inks, the luminescent pigments were each introduced into the printing ink Pantone Yellow.

Both printing inks thus have the same color impression of the remission under white light. Under illumination using the UV excitation light, the desired different specifically selected color impressions result. Since the luminescent pigments used have the same stabilities of the luminescence to chemical and physical attacks because of the same core-jacket structure (see, for example, example 3d of WO 2017/080654 A1), in particular the white color impression of the subregions 64 under UV illumination remains stable over the lifetime of the value document.

As a further special feature, the white luminescent subregion 64 stands out luminously upon UV excitation and even appears brighter than the also white, but not luminescent paper substrate 60 to the observer.

Such a design represents a high hurdle for a recreation, since the white color impression of the snowflake 64 under UV illumination not only has to initially appear correct, but rather the red, green, and blue luminous luminescent pigments mixed to generate the white color impression also have to have essentially the same stability to environmental influences in order to be able to maintain the white color impression under UV illumination of the mixed color over time. If, for example, the different luminescent pigments have different aging properties in a recreation, the snowflake of the recreation will display a color cast under UV illumination after some time, which can also be easily recognized by a layperson and can be assessed as an indication of a lack of authenticity of the document or a manipulation of the security element.

Comparative Example to FIG. 5

In a comparative example to FIG. 5, the green or blue luminescent pigment of the exemplary embodiment for FIG. 5 is used. An encapsulated luminescent pigment having the core-jacket structure of pigment system 1 is used as the red luminescent pigment, wherein only $Eu(TTA)_3$ $(TPPO)_2$ is introduced into the core as the red luminescent material, however.

In the comparative example, the light fastness of the red luminescent pigment is less here than the light fastness of the green or blue luminescent pigments (see WO2017/080654 A1, counterexample 1).

The blue luminescent printing ink corresponds to that from the exemplary embodiment of FIG. 5. The white luminescent printing ink contains the body color pigment Pantone Yellow, and a mixture of the blue and green luminescent pigments of pigment system 3 and the mentioned red luminescent pigment.

According to the above-described procedure, the mixing ratio of the luminescent pigments was determined so that under UV illumination, initially a white color impression with (x, y)=(0.35, 0.36) is achieved. The color impression of the remission under white light corresponds to (x, y)=(0.46, 0.48).

To produce the printing inks, the luminescent pigments were each introduced into the printing ink Pantone Yellow.

All three printing inks thus have the same color impression of the remission under white light and display different, initially specifically selected color impressions under illumination using the UV excitation light.

However, since the red luminescent pigment has worse color fastness than the blue and green luminescent pigments, the red component of the luminescence fades faster under sunlight irradiation, for example. The color impression under UV illumination of the initially white luminescent printing ink therefore shifts over the lifetime of a banknote into green. The snowflake of the printed image under UV illumination thus receives an unnatural green color tone and the contrast to the blue appearing background becomes weaker.

Figure 6:
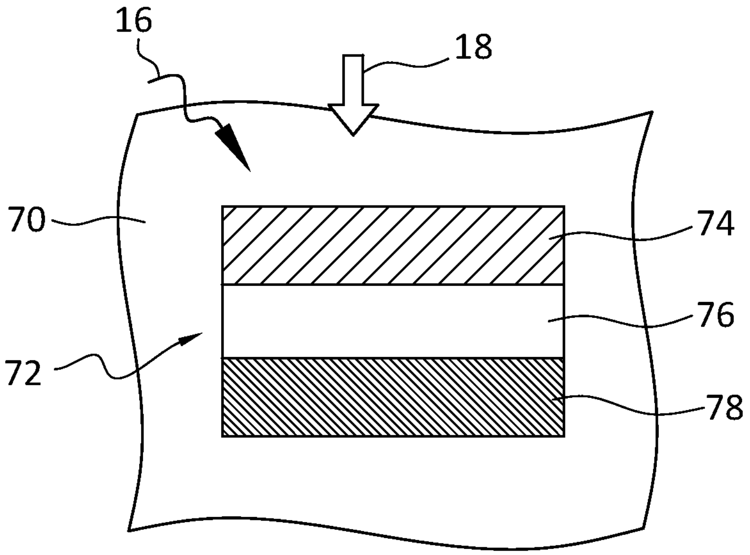
FIG. 6 shows the appearance of a security element printed on the substrate of a value or identification document according to a further exemplary embodiment upon illumination using a mixture of UV light and white light.

Exemplary Embodiment of FIG. 6

In the exemplary embodiment of FIG. 6, the color impression of the luminescence is not observed under illumination using an exclusively nonvisible excitation light, but rather in a mixture of white light 18 and nonvisible excitation light 16. An overall color impression thus results to which the body color of the printing ink contributes more strongly than under illumination using solely nonvisible excitation light. Moreover, the remission color impression of printed regions without luminescence can also be perceived.

The relative intensities of white light and nonvisible excitation light for the mixed illumination are advantageously selected as follows. For illustration, UV light is presumed to be the nonvisible excitation light here.

First, an intensity of the UV illumination is selected. For at least one printed region, the emitted spectrum is then measured under the selected intensity of UV illumination without additional white light. The measured spectrum is multiplied by the spectral sensitivity curve of the human eye and spectrally integrated in order to obtain a measure of the perceived brightness of the printed region under solely UV illumination.

An arbitrary intensity of the white light is then selected. For the abovementioned printed region, the remission spectrum under the selected white light intensity is then measured. The measured remission spectrum is multiplied by the spectral sensitivity curve of the human eye and spectrally integrated in order to obtain a measure of the perceived brightness of the remission of the printed region under white light.

The selected white light intensity is then adapted so that the perceived brightness under illumination using white light and under solely UV illumination are equal. In particular, for this purpose the selected white light intensity can be multiplied by the quotient of the measured brightness under UV illumination and the measured brightness under white light illumination.

This procedure is advantageously applied for multiple, in particular for all luminescent printed regions, wherein in each case the brightness under illumination using white light and under illumination using solely UV light is determined and the relative intensity of the white light is selected so that the two brightnesses are equal on average over all observed regions. In particular, the intensity of the white light is selected as the mean value of the adapted intensities of the white light determined for the individual printed regions.

Alternatively, for further, in particular for all further luminescent printed regions, the perceived brightness of the printed region under UV illumination can be measured using the intensity selected for the first printed region, and the perceived brightness under illumination using white light can be measured using the intensity adapted for the first printed region. The pigmentation of the further printing inks having the luminescent pigment(s) can then be adapted so that an equal perceived brightness under illumination using white light or using solely UV light is also obtained for the further printing inks.

FIG. 6 shows for this purpose as an exemplary embodiment a security element 72, which is printed on the paper substrate 70 of a value or identification document and contains three different subregions 74, 76, 78. In white light, the area of the security element 72 appears with a homogenous, monochromatic color impression (not shown), FIG. 6 illustrates the appearance in a mixed illumination made up of UV light 16 and white light 18. The subregion 74 displays an orange color impression upon mixed illumination, the subregion 76 a white color impression, and the subregion 78 a green color impression, so that the representation of a three-colored country flag orange-white-green results.

The white luminescent subregion 76 appears brighter than the unprinted paper substrate 70, but with the same color location, so that the white substrate is used as a local color reference.

The printing inks used for the subregions 74, 76, 78 all contain the same remission color pigments, so that they have the same color impression under white light and also the same stability of the remission to environmental influences.

In the exemplary embodiment, the red and green luminescent pigment of pigment system 1 and the blue luminescent pigment of pigment system 3 are used as luminescent pigments.

The green luminescent printing ink contains the body color pigment Pantone Red, and the green luminescent pigment of pigment system 1. Under mixed UV and white light illumination 16, 18, the printing ink displays a green color impression. The red color impression of the remission under white light corresponds to (x,y)=(0.51, 0.28).

The orange luminescent printing ink contains the body color pigment Pantone Red, and a mixture of the red and the green luminescent pigments of pigment system 1. The mixing ratio of the luminescent pigments was determined in the above-described manner so that under mixed UV and white light illumination 16, 18, an orange color impression is achieved. The color impression of the remission under solely white light corresponds to (x,y)=(0.51, 0.28).

The white luminescent printing ink contains the body color pigment Pantone Red, and a mixture of the red and green luminescent pigments of pigment system 1 and the blue luminescent pigment of pigment system 3. The mixing ratio of the luminescent pigments was adapted in the above-described manner so that under mixed UV and white light illumination 16, 18, a white color impression is achieved. The color impression of the remission under solely white light corresponds to (x,y)=(0.51, 0.28).

To produce the printing inks, the luminescent pigments were each introduced into the printing ink Pantone Red.

All three printing inks thus have the same red color impression of the remission under white light, but different, specifically selected color impressions under mixed UV and white light illumination 16, 18.

Since all three printing inks have the same stability of the luminescence to chemical and physical attacks, the color impressions of the printed regions under mixed UV and white light illumination remain stable over the lifetime of the value document.

In contrast, if the luminescent pigments have a recreation of different aging properties, the middle subregion 76 of the recreation will thus after some time display a noticeable color cast under mixed UV and white light illumination, or it can become darker faster than the inks of the outer subregions 74, 78, which is easily recognizable in particular in comparison to the color and brightness reference of the paper substrate 70.

Figure 7:
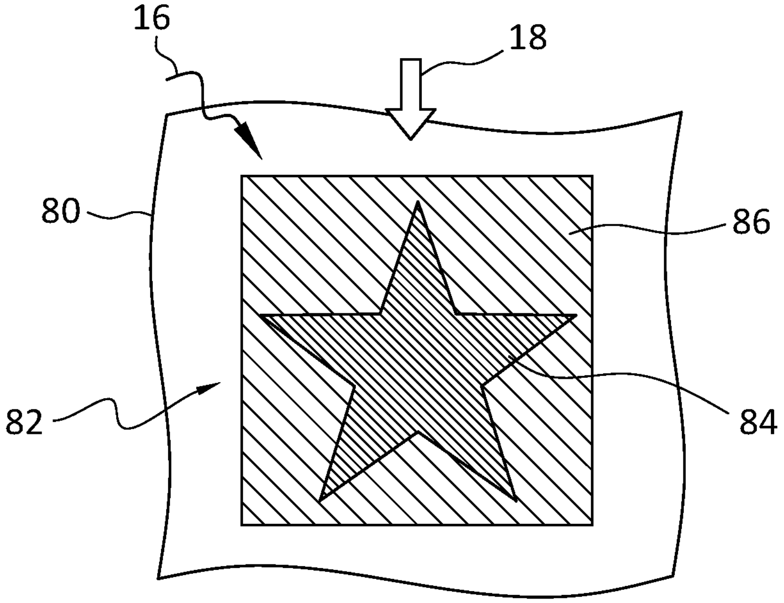
FIG. 7 shows a security element on a data carrier according to still another exemplary embodiment upon illumination using a mixture of UV light and white light.

Exemplary Embodiment of FIG. 7

As a further exemplary embodiment, which is designed for observation under a mixture of white light and UV excitation light, FIG. 7 shows a security element 82 on a data carrier 80 having two subregions 84, 86. In white light, the area of the security element 82 appears with a homogeneous, monochromatic red color impression. Upon an excitation using a mixture of UV light 16 and white light 18, both subregions 84, 86 luminesce and display a luminous yellow star 84 in front of a more weakly luminous yellow background 86. The two subregions thus generate a color impression having the same color location, but different brightness, in the luminescent image.

The intensively yellow luminescent printing ink of the subregion 84 is based on the printing ink Pantone Red and contains a mixture of the red and green luminescent pigments of pigment system 2. The mixing ratio of the luminescent pigments was determined in the above-described manner so that a yellow color impression is achieved under mixed UV and white light illumination 16, 18. The overall pigmentation of the luminescent pigments in the exemplary embodiment is 15 weight-percent. The color impression of the remission of the printing ink of the subregion 84 under solely white light corresponds to (x,y)=(0.51, 0.28).

The more weakly yellow luminescent printing ink of the subregion 86 is based on the printing ink Pantone Red and also contains a mixture of the red and green luminescent pigments of pigment system 2. The mixing ratio of the luminescent pigments was determined here in the above-described manner so that under mixed UV and white light illumination 16, 18, a yellow color impression is achieved. The overall pigmentation of the luminescent pigments is only 5 weight-percent, however. In comparison to the intensively yellow luminescent printing ink of the subregion 84, the remission in the more weakly yellow luminescent printing ink of the subregion 86 has a greater proportion of the color impression under mixed UV and white light illumination 16, 18.

In order to nonetheless achieve the same yellow color impression under mixed UV and white light illumination, in the more weakly luminescent printing ink, a greater proportion of the green luminescent pigment is used. The color impression of the remission under solely white light corresponds to (x,y)=(0.51, 0.28).

To produce the printing inks, the luminescent pigments were each introduced into the printing ink Pantone Red Both printing inks thus have the same color impression of the remission under white light and display the same color location, but at different brightness, under mixed UV and white light illumination.

Since both luminescent printing inks have equal stabilities of the luminescence to chemical and physical attacks, the color impressions and brightnesses of the luminescence of the two printed regions 84, 86 and thus the overall visual impression of the security element 82 remain stable over the lifetime of the value document.

The invention claimed is:

1. A method for producing a data carrier having a luminescent security element having at least two subregions, which at least do not completely overlap one another, the method comprising:

Z) specifying target chromaticity coordinates,

B1) providing a first printing ink, which upon illumination using white light generates a first color impression and upon illumination using excitation light has a first visible luminescence and generates a second color impression that corresponds to the specified target chromaticity coordinates, B2) providing a second printing ink, which upon illumination using white light also generates the first color impression and upon illumination using excitation light has a second visible luminescence and generates a third color impression, which has different chromaticity coordinates and/or a different brightness than the second color impression of the first printing ink, wherein printing inks are provided in step B1) and B2) as the first and second printing ink, and wherein remission and luminescence of each printing ink displays equally high stability to environmental influences, and D) producing the luminescent security element on the data carrier, wherein a first subregion is printed on the data carrier using the first printing ink and a second subregion, which at least does not completely overlap the first subregion, is printed on the data carrier using the second printing ink.

2. The method according to claim 1, wherein both the color impression of the first printing ink upon illumination using the excitation light, and the color impression of the second printing ink upon illumination using the excitation light differ from the first color impression, which is generated upon illumination using white light.

3. The method according to claim 1, wherein a fluorescent printing ink is provided as the first printing ink and a phosphorescent printing ink is provided as the second printing ink or vice versa.

4. The method according to claim 1, wherein in step Z), the specified target chromaticity coordinates is selected from white, blue, turquoise, violet, and mixed colors thereof, and that the color impression of the first printing ink upon illumination using the excitation light appears white and brighter than a color impression of a substrate, including a paper substrate of the data carrier.

5. The method according to claim 1, wherein in a step B3), a third, non-luminescent printing ink is provided, which upon illumination using white light also generates the first color impression and the remission of which displays equally high stability to environmental influences as that of the first and second printing ink, and in step D), a third subregion of the security element, which at least does not completely overlap with the first and second subregion, is printed on the data carrier using the third printing ink.

6. The method according to claim 1, wherein in step B1), a fluorescent printing ink is provided and in a step B4), a fourth, phosphorescent printing ink is provided, which upon illumination using white light also generates the first color impression and upon illumination using excitation light has a fourth visible luminescence and generates the second color impression matched to the first printing ink, and the remission and luminescence of each printing ink displays equally high stability to environmental influences as those of the first and second printing ink, and in step D), a fourth subregion of the security element, which at least does not completely overlap with the first and second subregion, is printed on the data carrier using the fourth printing ink.

7. The method according to claim 1, wherein in a step B5), a fifth, non-luminescent printing ink is provided, which upon illumination using white light generates a color impression that corresponds to the specified target chromaticity coordinates, and in step D), a fifth subregion of the security element is printed on the data carrier using the fifth printing ink, which subregion at least does not completely overlap with the first and second subregion.

8. The method according to claim 1, wherein at least one of the luminescent printing inks comprises a luminescent material, having, under the excitation light, a dominant wavelength between 380 nm and 500 nm.

9. The method according to claim 1, wherein at least one of the luminescent printing inks is provided as a mixture of multiple luminescent materials, including a printing ink having a first luminescent material provided as the second printing ink and a printing ink having a mixture of the first luminescent material and a second luminescent material provided as the first printing ink.

10. The method according to claim 1, wherein at least the first and second printing ink, including all luminescent printing inks are provided as printing inks having encapsulated luminescent pigments, which each comprise a core having an organic or organo-metallic luminescent material and a jacket encapsulating the core.

11. The method according to claim 1, wherein the first printing ink is provided in that in step Z), the target chromaticity coordinates are specified using tristimulus value proportions x, y, and L) at least two luminescent pigments are specified using their luminescence spectra, R) a remission color pigment is specified using a remission spectrum and a remission color pigment pigmentation, LB) from the luminescence spectra of the at least two luminescent pigments, the remission spectrum of the remission color pigment, CIE spectral value functions, and the specified target chromaticity coordinates, relative weight proportions of the at least two luminescent pigments are determined, and LM) the at least two luminescent pigments are mixed in the relative weight proportions determined in step LB) and introduced together with the remission color pigment into a clear lacquer in order to obtain the first printing ink having a luminescence, the chromaticity coordinates of which under illumination using the excitation light corresponds to the target chromaticity coordinates.

12. A data carrier, producible according to the method of claim 1, having a luminescent security element having at least two subregions, wherein in a first subregion, a first printing ink is applied to the data carrier, which upon illumination using white light generates a first color impression and upon illumination using excitation light has a first visible luminescence and generates a second color impression, which corresponds to the target chromaticity coordinates, wherein the first printing ink comprises a luminescent material which, upon illumination using excitation light, has a dominant wavelength between 380 nm and 500 nm;

in a second subregion, which at least does not completely overlap the first subregion, a second printing ink is applied to the data carrier, which upon illumination using white light also generates the first color impression and upon illumination using the excitation light has a second visible luminescence and generates a third color impression, which has different chromaticity coordinates and/or a different brightness than the first printing ink, wherein the remission and luminescence of both the first and second printing ink displays an essentially equally high stability to environmental influences.

13. The data carrier according to claim 12, wherein both the second color impression of the first printing ink upon illumination using the excitation light, and the third color impression of the second printing ink upon illumination using the excitation light differ from the first color impression, which is generated upon illumination using white light.

14. The data carrier according to claim 12, wherein the first printing ink is a fluorescent printing ink and the second printing ink is a phosphorescent printing ink or vice versa.

15. The data carrier according to claim 12, wherein the target chromaticity coordinates of the first printing ink upon illumination using the excitation light is selected from white, blue, turquoise, violet, and mixed colors thereof, and that the color impression of the first printing ink upon illumination using the excitation light appears white and thereby brighter than a color impression of a substrate, including a paper substrate of the data carrier.

16. The data carrier according to claim 12, wherein the security element displays different motifs upon illumination using white light and upon illumination using the excitation light, wherein the security element displays a homogeneous color area upon illumination using white light and/or that the security element displays a flag, a national symbol, or a nature motif, including a nature motif having a white subregion, upon illumination using the excitation light.

17. The data carrier according to claim 12, wherein in a third subregion of the security element, which at least does not completely overlap the first and second subregion, a third non-luminescent printing ink is applied, which upon illumination using white light also generates the first color impression and the remission of which displays equally high stability to environmental influences as the remission of the first and second printing ink.

18. The data carrier according to claim 12, wherein the first printing ink is a fluorescent printing ink, and that in a fourth subregion of the security element, which at least does not completely overlap the first and second subregion, a fourth, phosphorescent printing ink is applied, which upon illumination using white light also generates the first color impression and upon illumination using the excitation light has a fourth visible luminescence and generates the second color impression matched to the first printing ink, and the remission and luminescence of each printing ink displays equally high stability to environmental influences as those of the first and second printing ink.

19. The data carrier according to claim 12, wherein in a fifth subregion of the security element, which at least does not completely overlap the first and second subregion, a fifth, non-luminescent printing ink is applied, which upon illumination using white light generates a color impression which corresponds to the specified target chromaticity coordinates.

20. The data carrier according to claim 12, wherein at least one of the luminescent printing inks represents a mixture of multiple luminescent materials, wherein the second printing ink represents a printing ink having a first luminescent material and the first printing ink represents a mixture of the first luminescent material and a second luminescent material.

21. The data carrier according to claim 12, wherein at least the first and second printing ink, including all luminescent printing inks, are provided using encapsulated luminescent pigments, which each comprise a core having an organic or organometallic luminescent material and a jacket encapsulating the core.

* * * * *